US009648646B2

(12) United States Patent
Gao et al.

(10) Patent No.: US 9,648,646 B2
(45) Date of Patent: May 9, 2017

(54) METHOD AND DEVICE FOR ESTABLISHING PACKET DATA NETWORK CONNECTION

(71) Applicant: Huawei Device Co., Ltd., Shenzhen (CN)

(72) Inventors: Chenliang Gao, Beijing (CN); Xiaoyan Duan, Beijing (CN); Hui Jin, Beijing (CN); Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 205 days.

(21) Appl. No.: 14/531,908

(22) Filed: Nov. 3, 2014

(65) Prior Publication Data
US 2015/0055510 A1 Feb. 26, 2015

Related U.S. Application Data

(63) Continuation of application No. PCT/CN2013/078275, filed on Jun. 28, 2013.

(30) Foreign Application Priority Data

Jun. 30, 2012 (CN) .......................... 2012 1 0222875

(51) Int. Cl.
H04L 12/28 (2006.01)
H04W 4/00 (2009.01)
(Continued)

(52) U.S. Cl.
CPC ........... *H04W 76/02* (2013.01); *H04L 61/203* (2013.01); *H04W 8/04* (2013.01); *H04W 76/022* (2013.01);
(Continued)

(58) Field of Classification Search
CPC ..... H04W 76/02; H04W 8/04; H04W 76/022; H04W 84/12; H04W 88/16; H04W 48/14; H04L 61/203
See application file for complete search history.

(56) References Cited

U.S. PATENT DOCUMENTS

2006/0126584 A1 6/2006 Zhang et al.
2007/0264997 A1 11/2007 Chaudhary et al.
(Continued)

FOREIGN PATENT DOCUMENTS

CN 1529446 A 9/2004
CN 1627842 A 6/2005
(Continued)

OTHER PUBLICATIONS

3rd Generation Partnership Project; Technical Specification Group Services and System Aspects; Study on S2a Mobility based on GTP & WLAN access to EPC (SaMOG); Stage 2 (Release 12), 3GPP TR 23.852 v1.2.0, Technical Report, Jul. 2012, 64 pages.
(Continued)

*Primary Examiner* — Kiet Tang
(74) *Attorney, Agent, or Firm* — Slater Matsil, LLP

(57) ABSTRACT

Embodiments of the present invention provide a method and a device for establishing a packet data network PDN connection. A method includes: receiving, by a trusted wireless local area network access network TWAN device, a trigger message from a user equipment; obtaining, by the TWAN device, an access point name APN from the user equipment; sending, by the TWAN device, a create session request message carrying the APN to a PDN gateway; receiving, by the TWAN device, a create session response message carrying an IP address from the PDN gateway; and sending, by the TWAN device, the IP address to the user equipment. In this way, an additional PDN connection or a non-default
(Continued)

PDN connection is established for a user equipment to extend a network access range of the user equipment.

13 Claims, 9 Drawing Sheets

(51) Int. Cl.

| | | |
|---|---|---|
| *G06F 17/00* | (2006.01) | |
| *H04W 76/02* | (2009.01) | |
| *H04L 29/12* | (2006.01) | |
| *H04W 8/04* | (2009.01) | |
| *H04W 48/14* | (2009.01) | |
| *H04W 88/16* | (2009.01) | |
| *H04W 84/12* | (2009.01) | |

(52) U.S. Cl.
CPC ............ *H04W 48/14* (2013.01); *H04W 84/12* (2013.01); *H04W 88/16* (2013.01)

(56) References Cited

U.S. PATENT DOCUMENTS

| | | | | |
|---|---|---|---|---|
| 2011/0099604 A1* | 4/2011 | Zhou | ................ | H04L 12/14 726/1 |
| 2014/0341138 A1* | 11/2014 | Roeland | .............. | H04W 76/021 370/329 |

FOREIGN PATENT DOCUMENTS

| | | |
|---|---|---|
| CN | 101730142 A | 6/2010 |
| CN | 101883329 A | 11/2010 |
| WO | 2004032554 A1 | 4/2004 |

OTHER PUBLICATIONS

3rd Generation Partnership Project; Technical Specification Group Services and System Aspects; Architecture enhancements for non-3GPP accesses (Release 11), 3GPP TS 23.402 V11.2.0 Technical Specification, Mar. 2012, 251 pages.

Ericsson, "Proposal for a SaMOG phase 2 solution." 3GPP TSG SA WG2 Meeting #92, TD S2-122712, Jul. 9-13, 2012, 6 pages.

Juniper Networks, "P-CR 23.852 v1.2.0 SaMOG Layer 2 Solution," SA WG2 Meeting #92, S2-122735, Jul. 9-13, 2012, 12 pages.

Liu et al., "DHCP Options for 3GPP Specific Information" Internet-Draft, draft-liu-dhc-3gpp-option-00.txt, Sep. 29, 2011, 14 pages.

Valmikam et al., "EAP Attributes for WiFi—EPC Integration." draft-ietf-netext-wifi-epc-eap-attributes-00, Apr. 23, 2012, 12 pages.

"3rd Generation Partnership Project; Technical Specification Group Services and System Aspects; Architecture enhancements for non-3GPP accesses (Release 11)," 3GPP TS 23.402, v11.3.0 (Jun. 2012), 252 pages.

LTE, "3rd Generation Partnership Project; Technical Specification Group Services and System Aspects; General Packet Radio Service (GPRS) Enhancements for Evolved Universal Terrestrial Radio Access Network, (E-UTRAN) Access, (Release11)," 3GPP TS 23.401 v.11.2.0, Jun. 2012, 285 pages.

LTE, "3rd Generation Partnership Project; Technical Specification Group Services and System Aspects; Architecture Enhancements for Non-3GPP Accesses (Release 10)," 3GPP TS 23.402 v10.7.0, Mar. 2012, 232 pages.

LTE, "3rd Generation Partnership Project; Technical Specification Group Services and System Aspects; Study on S2a Mobility based on GTP & WLAN Access to EPC (SaMOG); Stage 2, (Release 12)," 3GPP TR 23.852 v.1.1.0, May 2015, 41 pages.

Gundavelli, S., et al., "Proxy Mobile IPv6," Network Working Group, Request for Comments: 5213, Category: Standards Track, Aug. 2008, 92 pages.

IEEE Computer Society, "Part 11: Wireless LAN Medium Access Control (MAC) and Physical Layer (PHY) Specifications," IEEE Standard for Information Technology—Telecommunications and Information Exchange Between Systems, Local and Metropolitan Area Networks, Specific Requirements, IEEE Std 802-11-2012, Mar. 29, 2012, 2793 pages.

3rd Generation Partnership Project; Technical Specification Group Core Network and Terminals; Non-Access-Stratum (NAS) Protocol for Evolved Packet System (EPS); Stage 3 (Release 11), 3GPP TS 24.301 V11.3.0 (Jun. 2012), 335 pages.

\* cited by examiner

METHOD AND DEVICE FOR ESTABLISHING PACKET DATA NETWORK CONNECTION

This application is a continuation of international Application No. PCT/CN2013/078275, filed on Jun. 28, 2013, which claims priority to Chinese Patent Application No. 201210222875.7, filed on Jun. 30, 2012, both of which are hereby incorporated by reference in their entireties.

TECHNICAL FIELD

The present invention relates to communications technologies, and in particular, to a method and a device for establishing a packet data network connection.

BACKGROUND

A user equipment (UE) can access an evolved packet core (EPC) in an evolved packet system (EPS) by using a trusted wireless local area network access network (TWAN).

In the prior art, when a user equipment accesses an EPC by using a TWAN, the user equipment can only establish a packet data network (PDN) connection of a default access point name (APN), whereas some default APNs can only access a specific network, and consequently, network access of the user equipment is restricted.

SUMMARY

Embodiments of the present invention provide a method and a device for establishing a packet data network connection, to establish an additional PDN connection or a PDN connection of a non-default APN for a user equipment to extend a network access range of the user equipment.

According to one aspect, an embodiment of the present invention provides a method for establishing a packet data network connection, which includes: receiving, by a trusted wireless local area network access network TWAN device, a trigger message from a user equipment; obtaining, by the TWAN device, an access point name APN from the user equipment; sending, by the TWAN device, a create session request message carrying the APN to a PDN gateway; receiving, by the TWAN device, a create session response message carrying an IP address from the PDN gateway; and sending, by the TWAN device, the IP address to the user equipment.

An embodiment of the present invention further provides another method for establishing a packet data network connection, which includes: determining, by a user equipment, a PDN type of a connection to be established; sending, by the user equipment, a trigger message carrying an access point name APN to a trusted wireless local area network access network TWAN device according to the determined PDN type, where the trigger message triggers the TWAN device to send a create session request message carrying the APN to a PDN gateway, and receiving, by the TWAN device, a create session response message carrying an IP address from the PDN gateway; and receiving, by the user equipment, the IP address from the TWAN device.

An embodiment of the present invention further provides still another method for establishing a packet data network connection, which includes: determining, by a user equipment, a PDN type of a connection to be established; sending, by the user equipment, a trigger message to a trusted wireless local area network access network TWAN device according to the determined PDN type; receiving, by the user equipment, a request message from the TWAN device; sending, by the user equipment, a response message carrying an APN to the TWAN device, where the response message triggers the TWAN device to send a create session request message carrying the APN to a PDN gateway, and receiving a create session response message carrying an IP address from the PDN gateway; and receiving, by the user equipment, the IP address from the TWAN device.

An embodiment of the present invention further provides yet another method for establishing a packet data network connection, which includes: determining, by a user equipment, a PDN type of a connection to be established; sending, by the user equipment, a trigger message to a trusted wireless local area network access network TWAN device according to the determined PDN type; sending, by the user equipment, a request message carrying an APN to the TWAN device, where the request message triggers the TWAN device to send a create session request message carrying the APN to a PDN gateway, and receiving a create session response message carrying an IP address from the PDN gateway; and receiving, by the user equipment, the IP address from the TWAN device.

An embodiment of the present invention further provides a trusted wireless local area network access network device, which includes: a receiving module, configured to receive a trigger message from a user equipment; an obtaining module, configured to obtain an access point name APN from the user equipment; a sending module, configured to send a create session request message carrying the APN to a packet data network PDN gateway, where: the receiving module is further configured to receive a create session response message carrying an IP address from the PDN gateway; and the sending module is further configured to send the IP address to the user equipment.

An embodiment of the present invention further provides a user equipment, which includes: a determining module, configured to determine a packet data network PDN type of a connection to be established; a sending module, configured to send, according to the determined PDN type, a trigger message to a trusted wireless local area network access network TWAN device, where the trigger message triggers the TWAN device to send a create session request message carrying an APN to a PDN gateway, and the TWAN device receives a create session response message carrying an IP address from the PDN gateway; and a receiving module, configured to receive the IP address from the TWAN device.

An embodiment of the present invention further provides another user equipment, which includes: a determining module, configured to determine a PDN type of a connection to be established; a sending module, configured to send a trigger message to a trusted wireless local area network access network TWAN device according to the determined PDN type; a receiving module, configured to receive a request message from the TWAN device, where: the sending module is further configured to send a response message carrying an APN to the TWAN device, where the response message triggers the TWAN device to send a create session request message carrying the APN to a PDN gateway and receive a create session response message carrying an IP address from the PDN gateway; and the receiving module is further configured to receive the IP address from the TWAN device.

An embodiment of the present invention further provides still another user equipment, which includes: a determining module, configured to determine a PDN type of a connection to be established; a sending module, configured to send a trigger message to a trusted wireless local area network access network TWAN device according to the determined PDN type, where: the sending module is further configured to send a request message carrying an APN to the TWAN device, where the request message triggers the TWAN device to send a create session request message carrying the APN to a PDN gateway and receive a create session response message carrying an IP address from the PDN gateway; and a receiving module, configured to receive the IP address from the TWAN device.

In the method and device for establishing a packet data network connection provided by the embodiments of the present invention, after a TWAN device receives a trigger message from a user equipment, the TWAN device initiates a create session request message carrying an obtained APN to a PDN gateway, so that an additional PDN connection or a PDN connection of a non-default APN is established for the user equipment to extend a network access range of the user equipment.

According to another aspect, an embodiment of the present invention further provides a method for establishing a packet data network connection, which includes: obtaining, by a trusted wireless local area network access network TWAN device, an access point name APN from a user equipment, and obtaining subscription information of the user equipment from a home subscriber server/an authentication, authorization and accounting HSS/AAA; determining, by the TWAN device, a PDN gateway according to at least the APN and the subscription information; sending, by the TWAN device, a create session request message carrying the APN to the determined PDN gateway; receiving, by the TWAN device, a create session response message carrying an IP address from the PDN gateway; and sending, by the TWAN device, the IP address to the user equipment.

An embodiment of the present invention further provides a trusted wireless local area network access network device, which includes: an obtaining module, configured to obtain an access point name APN from a user equipment, and obtain subscription information of the user equipment from a home subscriber server/an authentication, authorization and accounting HSS/AAA; a determining module, configured to determine a packet data network PDN gateway according to at least the APN and the subscription information; a sending module, configured to send a create session request message carrying the APN to the determined PDN gateway; and a receiving module, configured to receive a create session response message carrying an IP address from the PDN gateway, where: the sending module is further configured to send the IP address to the user equipment.

In the method and device for establishing a packet data network PDN connection provided by the embodiments of the present invention, a TWAN device determines a PDN gateway according to an APN obtained from a user equipment and subscription information of the user equipment obtained from an HSS/an AAA, and initiates a create session request message carrying the obtained APN to the determined PDN gateway, so that an additional PDN connection or a PDN connection of a non-default APN is established for the user equipment to extend a network access range of the user equipment.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show some embodiments of the present invention, and persons of ordinary skill in the art may still derive other drawings according to these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the embodiments to be described are a part rather than all of the embodiments of the present invention. All other embodiments obtained by persons of ordinary skill in the art based on the embodiments of the present invention without creative efforts shall fall within the protection scope of the present invention.

A user equipment involved in this application may be a device that can provide voice and/or data connectivity, a handheld device with a wireless connection function or another processing device connected to a wireless modem. A wireless user equipment may communicate with one or more core networks by using a radio access network (for example, RAN), such as a mobile phone (or called a "cellular" phone), a portable, pocket-size, handheld, computer built-in, or vehicle-mounted mobile apparatus, a personal communication service (PCS) telephone, a cordless telephone, a session initiation protocol (SIP) telephone, a wireless local loop (WLL) station, and a personal digital assistant (PDA). The wireless user equipment may also be called a system, a subscriber unit (Subscriber Unit), a subscriber station, a mobile station, a mobile, a remote station, an access point, a remote terminal, an access terminal, and the like.

Figure 1:
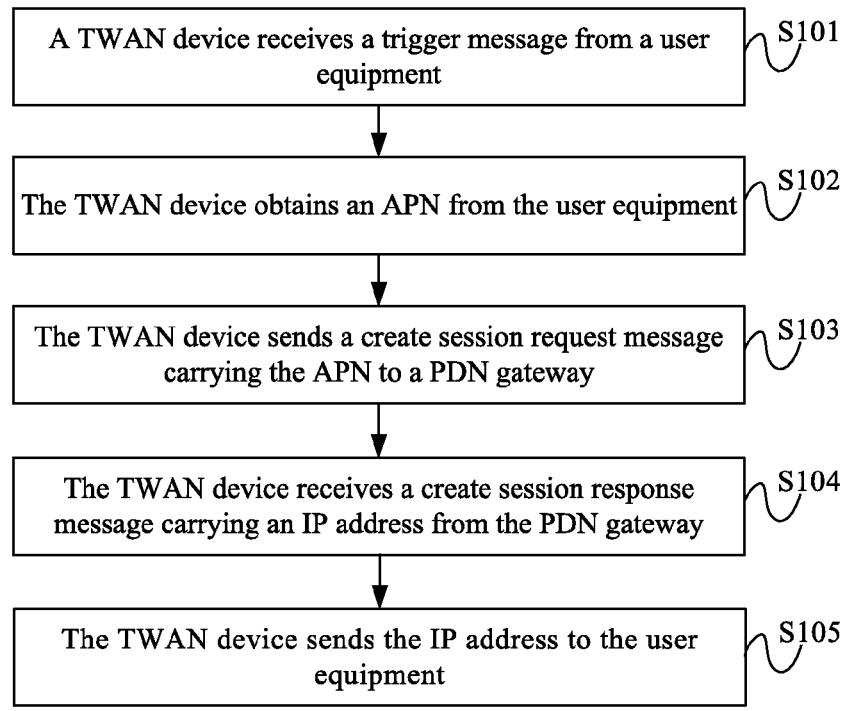
FIG. 1 is a flowchart of an embodiment of a method for establishing a packet data network connection according to the present invention.

FIG. 1 is a flowchart of an embodiment of a method for establishing a packet data network connection provided by the present invention. As shown in FIG. 1, the method includes:

S101. A trusted wireless local area network access network (TWAN) device receives a trigger message from a user equipment.

S102. The TWAN device obtains an access point name (APN) from the user equipment.

S103. The TWAN device sends a create session request message carrying the APN to a PDN gateway (P-GW).

S104. The TWAN device receives a create session response message carrying an IP address from the PDN gateway.

S105. The TWAN device sends the IP address to the user equipment.

When the user equipment needs to establish a PDN connection, the TWAN device generally obtains an APN from a home subscriber server (HSS) on a network side, so that a PDN connection of a default APN is established for the user equipment.

In this embodiment, the user equipment may initiate a corresponding trigger message to the TWAN device according to a PDN type of a connection to be established. For example, if the user equipment wants to establish a PDN connection of an Internet Protocol (IP) version 4 IPV4 type, the user equipment may send a Dynamic Host Configuration Protocol (DHCP) version 4 DHCPV4 request message or a router solicitation message (Router Solicitation, RS) or a neighbor solicitation message (Neighbor Solicitation, NS) to the TWAN device; and if the user equipment wants to establish a PDN connection of an IPV6 type, the user equipment may send a DHCPV6 request message or an RS or a neighbor solicitation message to the TWAN device.

The TWAN device may obtain an APN from the user equipment; after receiving a trigger message from the user equipment, the TWAN device may send a create session request message to the PDN gateway according to the APN obtained from the user equipment, where the create session request message carries the APN obtained from the user equipment; after the TWAN device receives a create session response message carrying an IP address from the PDN gateway, the TWAN device may send the IP address to the user equipment, so that an additional PDN connection or a PDN connection of a non-default APN is established between the user equipment and the PDN gateway.

As one feasible implementation manner, the user equipment may carry an APN in the trigger message sent to the TWAN device, that is, the TWAN device may obtain the APN from the trigger message.

As another feasible implementation manner, when determining that the user equipment has already established at least one PDN connection, the TWAN device may send a request message to the user equipment to request obtaining of an APN; further, the TWAN device may receive a response message carrying the APN from the user equipment, and the TWAN device obtains the APN from the response message, where after the TWAN device receives the trigger message from the user equipment, the determining whether the user equipment has already established a PDN connection by using a WLAN may be as follows: If subscription data of an HSS/an authentication, authorization, and accounting (AAA) already has PDN connection information of the user equipment, the TWAN device may determine that the user equipment has already established a PDN connection by using the WLAN; or, after the user equipment has established a PDN connection by using the WLAN, information about the user equipment may be stored on the WLAN; therefore, the TWAN device may also determine, according to the information about the user equipment stored on the WLAN, whether the user equipment has already established a PDN connection by using the WLAN. If the user equipment has already established a PDN connection, the trigger message currently received by the TWAN device is to request establishment of an additional PDN connection.

As another feasible implementation manner, the TWAN device may further receive a request message carrying an APN from the user equipment, and the TWAN device obtains the APN from the request message. For example, after the user equipment sends a trigger message to the TWAN device, the user equipment may further send a request message carrying an APN to the TWAN device.

It may be understood that the foregoing is only several feasible implementation manners in which the TWAN device obtains an APN from the user equipment and does not constitute a limitation on the present invention.

It should be noted that the create session request message that the TWAN device sends to the PDN gateway may further carry other information like a PDN type. The trigger message that the user equipment sends to the TWAN device depends on a PDN type determined by the user equipment; therefore, after receiving the trigger message from the user equipment according to the type of the trigger message, the TWAN device may determine a PDN type of a connection that the user equipment requests to establish. For example, if the trigger message received by the TWAN device is a DHCPV4 request message, the PDN type is IPV4; if the trigger message received by the TWAN device is a DHCPV6 request message, the PDN type is IPV6; and if the trigger message received by the TWAN device is a DHCPV4V6 request message, the PDN type is IPV4V6.

Optionally, the TWAN device may send a create session request message to the PDN gateway when determining that the APN is a non-default APN.

Related information about a PDN connection already established by the user equipment and locally stored by the TWAN device includes default APN information. Therefore, the TWAN device may determine, according to the locally stored related information about the PDN connection, whether the APN obtained from the user equipment is a default APN. In one implementation scenario, if the TWAN device determines that the APN obtained from the user equipment is a default APN and the PDN type that the user equipment requests to establish has already been allocated to the user equipment, the TWAN device may not send a create session request message to the PDN gateway. In another implementation scenario, if the TWAN device determines that the APN obtained from the user equipment is a non-default APN and PDN type that the user equipment requests to establish is not allocated to the user equipment, the TWAN device may send a create session request message to the PDN gateway.

In the method for establishing a packet data network (PDN) connection provided by this embodiment, after a TWAN device receives a trigger message from a user equipment, the TWAN device initiates, according to an APN obtained from the user equipment, a create session request message carrying the obtained APN to a PDN gateway, so that an additional PDN connection or a PDN connection of a non-default APN is established for the user equipment to extend a network access range of the user equipment.

Figure 2:
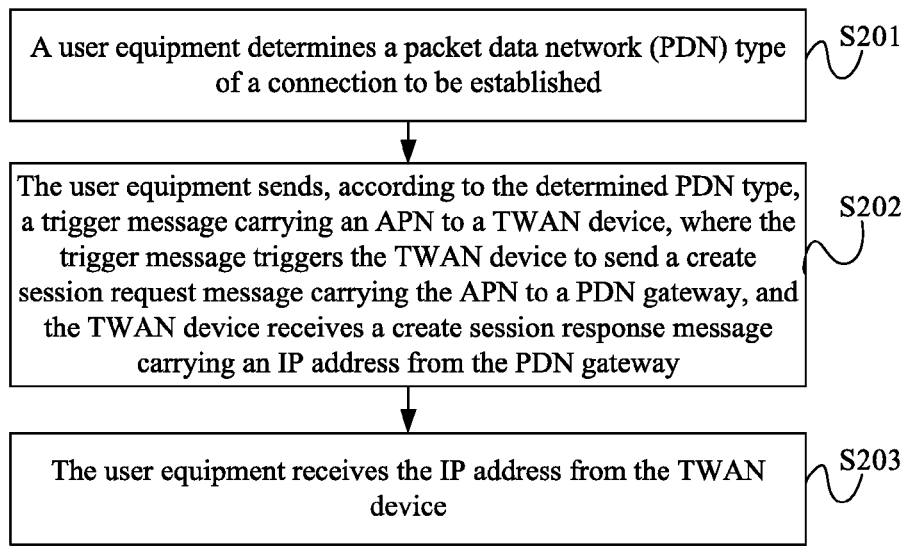
FIG. 2 is a flowchart of another embodiment of a method for establishing a packet data network connection according to the present invention.

FIG. 2 is a flowchart of another embodiment of a method for establishing a packet data network connection provided by the present invention. As shown in FIG. 2, the method includes:

S201. A user equipment determines a packet data network (PDN) type of a connection to be established.

S202. The user equipment sends, according to the determined PDN type, a trigger message carrying an access point name (APN) to a trusted wireless local area network access network (TWAN) device, where the trigger message triggers the TWAN device to send a create session request message carrying the APN to a PDN gateway (P-GW), and the TWAN device receives a create session response message carrying an IP address from the PDN gateway.

S203. The user equipment receives the IP address from the TWAN device.

The user equipment may initiate a corresponding trigger message to the TWAN device according to the PDN type of the connection to be established. For example, if the user equipment wants to establish a PDN connection of an IPV4 type, the user equipment may send a DHCPV4 solicitation message or an RS or a neighbor solicitation message to the TWAN device; and if the user equipment wants to establish a PDN connection of an IPV6 type, the user equipment may send a DHCPV6 solicitation message or an RS or a neighbor solicitation message to the TWAN device.

The user equipment may carry an APN directly in the trigger message, so that the TWAN device can initiate a create session request message carrying the APN to the PDN gateway after receiving the trigger message carrying the APN.

In the method for establishing a packet data network connection provided by this embodiment, after a user equipment sends a trigger message carrying an APN to a TWAN device, the TWAN device may initiate a create session request message carrying an obtained APN to a PDN gateway, so that an additional PDN connection or a PDN connection of a non-default APN is established for the user equipment to extend a network access range of the user equipment.

Figure 3:
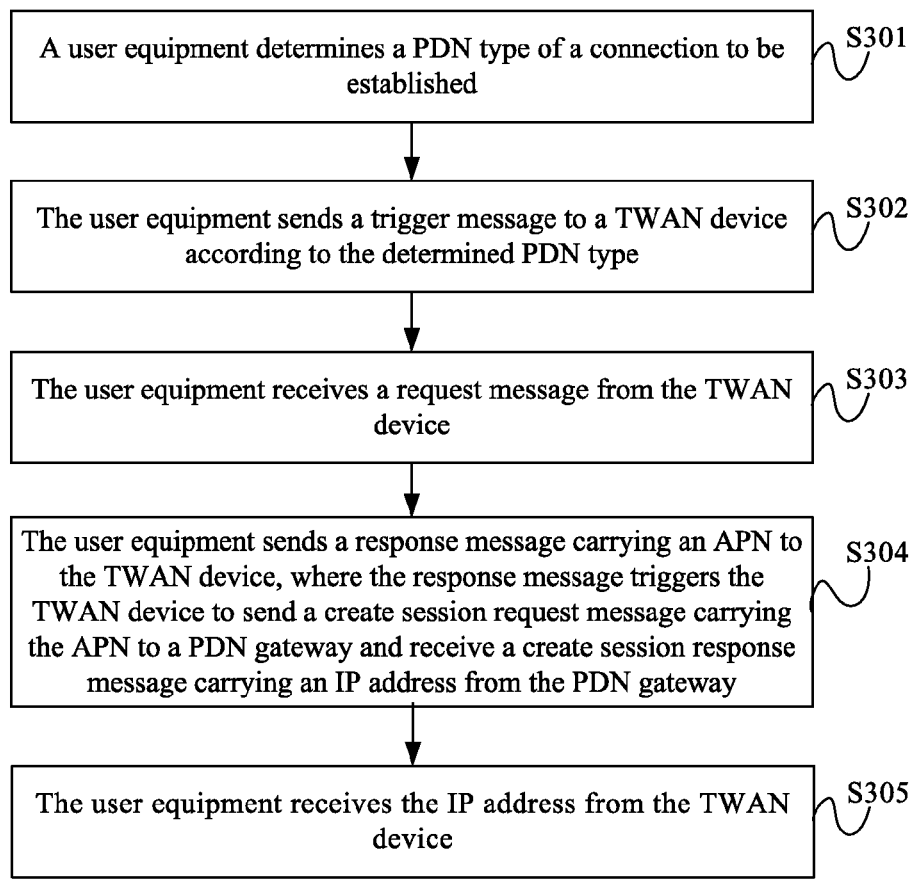
FIG. 3 is a flowchart of still another embodiment of a method for establishing a packet data network connection according to the present invention.

FIG. 3 is a flowchart of still another embodiment of a method for establishing a packet data network connection provided by the present invention. As shown in FIG. 3, the method includes:

S301. A user equipment determines a packet data network (PDN) type of a connection to be established.

S302. The user equipment sends a trigger message to a trusted wireless local area network access network (TWAN) device according to the determined PDN type.

S303. The user equipment receives a request message from the TWAN device.

S304. The user equipment sends a response message carrying an APN to the TWAN device, where the response message triggers the TWAN device to send a create session request message carrying the APN to a PDN gateway (P-GW) and receive a create session response message carrying an IP address from the PDN gateway.

S305. The user equipment receives the IP address from the TWAN device.

This embodiment is different from the embodiment shown in FIG. 2 in that: after the user equipment sends the trigger message to the TWAN device according to the PDN type of the connection to be established, if the user equipment receives a request message that is sent by the TWAN device and used to request obtaining of an APN, the user equipment may return the response message carrying the APN to the TWAN device, so that the TWAN device can initiate a create session request message carrying the APN to the PDN gateway after receiving a trigger message carrying the APN.

In the method for establishing a PDN connection provided by this embodiment, after a user equipment sends a trigger message to a TWAN device, if a request message is received from the TWAN device, the user equipment may return a response message carrying an APN to the TWAN device, so that the TWAN device can initiate a create session request message carrying the obtained APN to a PDN gateway, so that an additional PDN connection or a PDN connection of a non-default APN is established for the user equipment to extend a network access range of the user equipment.

Figure 4:
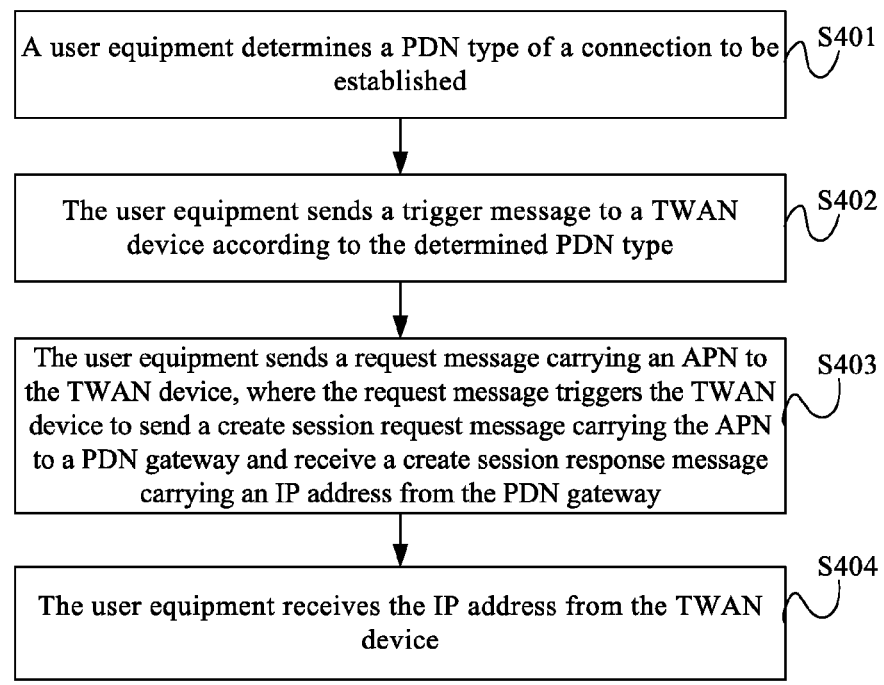
FIG. 4 is a flowchart of yet another embodiment of a method for establishing a packet data network connection according to the present invention.

FIG. 4 is a flowchart of yet another embodiment of a method for establishing a packet data network connection provided by the present invention. As shown in FIG. 4, the method includes:

S401. A user equipment determines a packet data network (PDN) type of a connection to be established.

S402. The user equipment sends a trigger message to a trusted wireless local area network access network (TWAN) device according to the determined PDN type.

S403. The user equipment sends a request message carrying an APN to the TWAN device, where the request message triggers the TWAN device to send a create session request message carrying the APN to a PDN gateway (P-GW) and receive a create session response message carrying an IP address from the PDN gateway.

S404. The user equipment receives the IP address from the TWAN device.

This embodiment is different from the embodiment shown in FIG. 2 in that: After the user equipment sends the trigger message to the TWAN device according to the PDN type of the connection to be established, the user equipment may further send the request message carrying the APN to the TWAN device, so that the TWAN device can initiate a create session request message carrying the APN to the PDN gateway after receiving a trigger message carrying the APN.

In the method for establishing a PDN connection provided by this embodiment, after a user equipment sends a trigger message to a TWAN device, the user equipment may further return a request message carrying an APN to the TWAN device, so that the TWAN device can initiate a create session request message carrying the obtained APN to a PDN gateway, and an additional PDN connection or a PDN connection of a non-default APN is established for the user equipment to extend a network access range of the user equipment.

Figure 5:
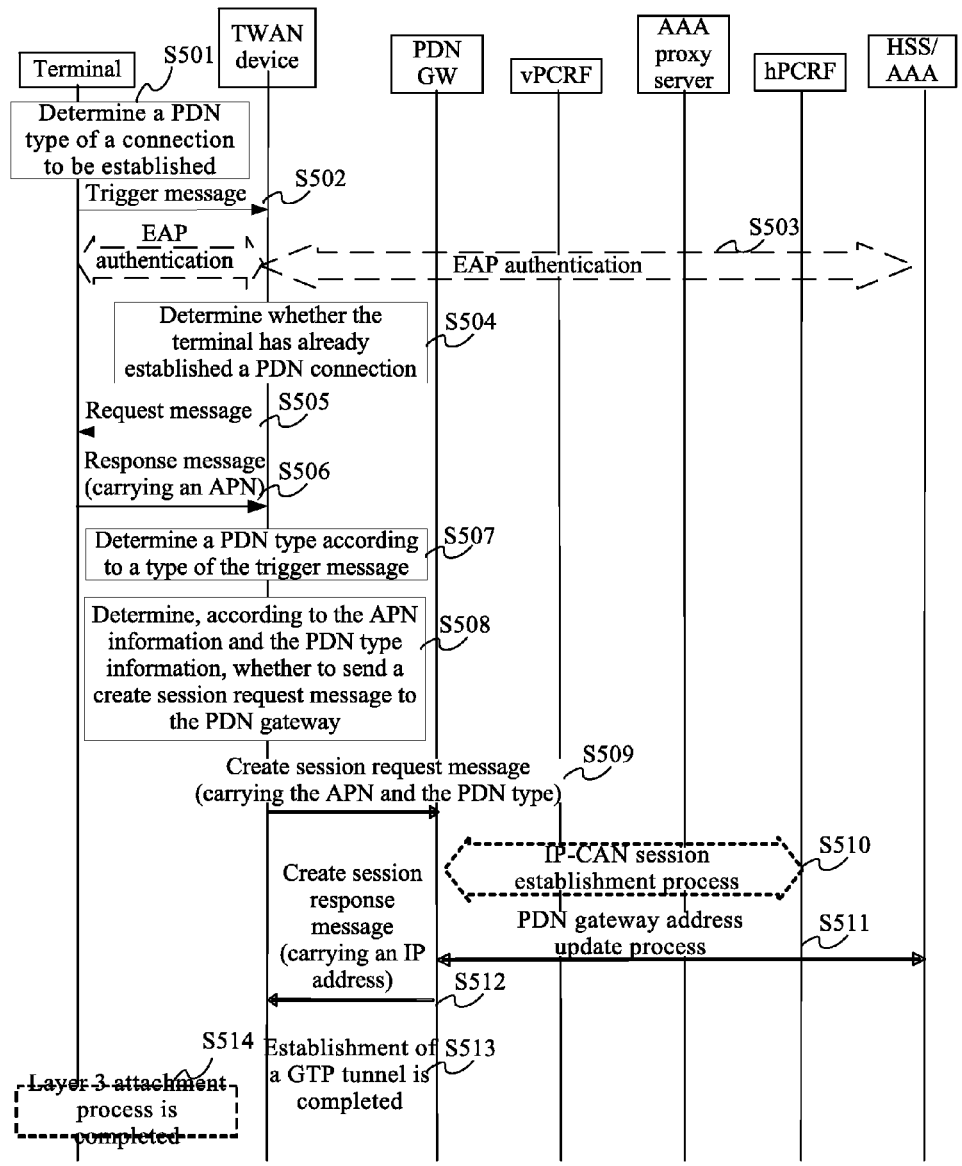
FIG. 5 is a flowchart of still yet another embodiment of a method for establishing a packet data network connection according to the present invention.

FIG. 5 is a flowchart of yet another embodiment of a method for establishing a packet data network connection provided by the present invention. As shown in FIG. 5, the method includes:

S501. A user equipment determines a packet data network (PDN) type for a connection to be established.

S502. The user equipment sends a trigger message to a trusted wireless local area network access network (TWAN) device.

S503. The user equipment and an HSS/an AAA execute an EAP authentication process.

It should be noted that S503 is an optional step.

S504. The TWAN device determines whether the user equipment has already established a PDN connection; if the user equipment has already established a PDN connection and the trigger message carries an APN, S507 is executed;

if the user equipment has already established a PDN connection and the trigger message does not carry an APN, S505 is executed; and if the user equipment does not establish a PDN connection, S509 is executed.

S505. The TWAN device sends a request message to the user equipment, where the request message is used to request obtaining of an APN.

The request message here may be a Generic Advertisement Service Access Network Query Protocol (Generic Advertisement Service Access Network Query Protocol, GAS-ANQP Query) message and carry 3G cellular network information, and the request message may also be another message of GAS-ANQP, which is not further listed herein.

S506. The user equipment sends a response message of the request message to the TWAN device, where the response message carries an APN.

The response message of the request message may be a GAS-ANQP Query response, and the response message carries an APN. Response messages corresponding to other GAS-ANQP request messages are also different, which are not further listed one by one.

It should be noted that S505 and S506 may further be as follows: The user equipment sends a request message carrying an APN to the TWAN device.

S504 to S506 are a process of obtaining an APN by the TWAN device from the user equipment. It should be noted that this process may be executed before the EAP authentication process, and may also executed after the EAP authentication process.

S507. The TWAN device determines a PDN type according to a type of the trigger message.

S508. The TWAN device determines, according to at least the APN and the PND type, whether to send a create session request message to a PDN gateway (PDN Gateway, P-GW).

If the APN is a default APN and the PDN type has already been allocated to the user equipment, the TWAN device does not send the create session request message to the PDN gateway, and the process ends; and if the APN is a non-default APN and the PDN type is not allocated to the user equipment, S509 is executed.

S509. The TWAN device sends the create session request message to the PDN gateway, where the create session request message carries a PDN type and an APN.

The create session request message (create session request) message carries an APN and a PDN type. The APN is an APN that the TWAN device obtains from the user equipment, and the PDN type is PDN type information that the TWAN device determines according to the type of the trigger message.

S510. The PDN gateway and a home policy and charging rules function (home Policy and Charging Rules Function, hPCRF) execute a process of establishing an IP-CAN session.

S511. The PDN gateway and the HSS/AAA execute a process of updating a PDN gateway address.

S512. The PDN gateway returns a create session response (create session response) message to the TWAN device, where the create session response message carries an IP address.

S513. Establishment of a General Packet Radio Service Tunnelling Protocol (General Packet Radio Service Tunnelling Protocol, GTP) tunnel between the PDN gateway and the TWAN device is completed.

S514. The user equipment completes a layer 3 (IP layer) attachment process.

In the method for establishing a packet data network PDN connection provided by this embodiment, a user equipment may initiate a trigger message to a TWAN device; and after the TWAN device receives the trigger message from the user equipment, the TWAN device may determine a PDN type according to an APN obtained from the user equipment and a type of the trigger message, and initiate a create session request message carrying the APN and the PDN type to a PDN gateway, so that an additional PDN connection or a PDN connection of a non-default APN is established for the user equipment to extend a network access range of the user equipment.

Figure 6:
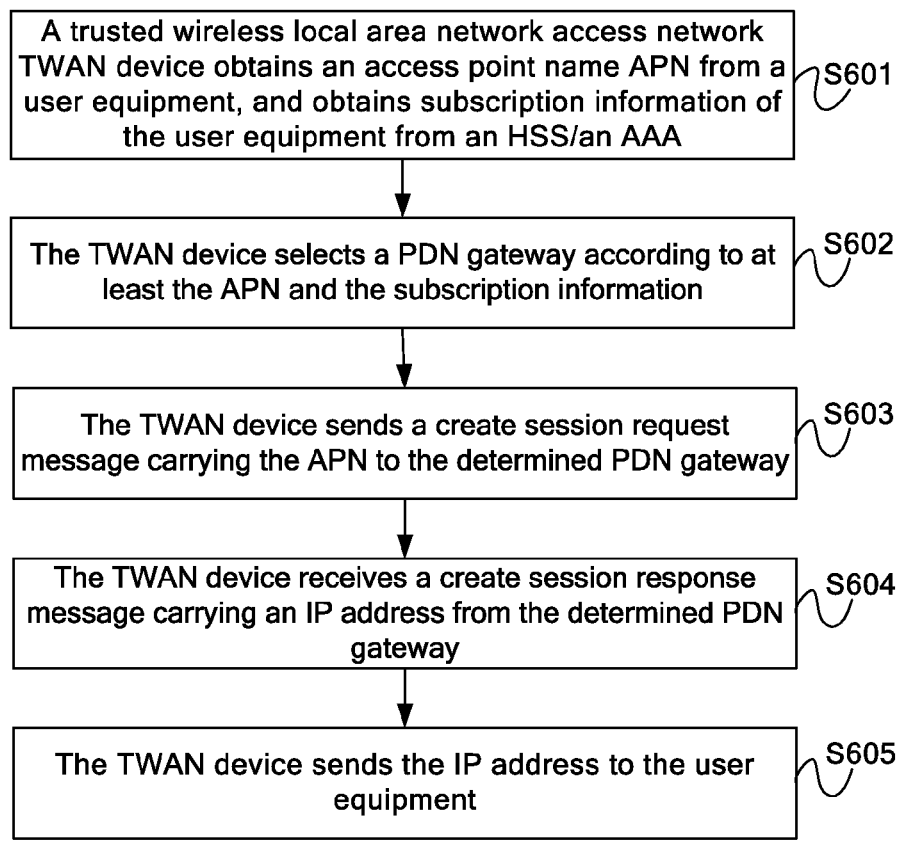
FIG. 6 is a flowchart of still yet another embodiment of a method for establishing a packet data network connection according to the present invention.

FIG. 6 is a flowchart of yet another embodiment of a method for establishing a packet data network connection provided by the present invention. As shown in FIG. 6, the method includes:

S601. A trusted wireless local area network access network (TWAN) device obtains an access point name (APN) from a user equipment, and obtains subscription information of the user equipment from a home subscriber server/an authentication, authorization and accounting (HSS/AAA).

S602. The TWAN device determines a PDN gateway according to at least the APN and the subscription information.

S603. The TWAN device sends a create session request message carrying the APN to the determined PDN gateway (PDN Gateway, P-GW).

S604. The TWAN device receives a create session response message carrying an IP address from the determined PDN gateway.

S605. The TWAN device sends the IP address to the user equipment.

In this embodiment, the TWAN device may determine, according to the APN obtained from the user equipment and the subscription data of the user equipment obtained from the HSS/AAA, a PDN gateway that establishes an additional PDN connection or a PDN connection of a non-default APN for the user equipment, and initiate a create session request message to the PDN gateway.

Optionally, the TWAN device may receive a message carrying an APN from the user equipment and the HSS/AAA in a process of executing Extensible Authentication Protocol EAP authentication by the user equipment and the HSS/AAA. For example, the TWAN device may receive a first message from the user equipment in the process of executing the Extensible Authentication Protocol EAP authentication by the user equipment and the HSS/AAA, where the first message carries an APN; or the TWAN device may receive a second message from the HSS/AAA during the EAP authentication, where the second message carries an APN, and the APN carried in the second message is obtained by the HSS/AAA from the user equipment.

The TWAN device may include a trusted WLAN access network (WLAN AN), a trusted WLAN access peer/proxy (Trusted WLAN Access peer/proxy, TWAP), and a trusted WLAN access gateway (Trusted WLAN Access Gateway, TWAG). The WLAN AN includes one or more sets of multiple wireless local area network access points.

As one feasible implementation manner, the TWAP may obtain an APN from a message sent by the user equipment or the HSS/AAA in a process of executing Extensible Authentication Protocol EAP authentication by the user equipment or the HSS/AAA. After obtaining the APN, the TWAP may send a first WLAN attach request to the TWAG, and carry the APN in the first WLAN attach request.

Optionally, the TWAP may further obtain subscription information of the user equipment from the HSS or the AAA, and send a second WLAN attach request carrying the subscription information to the TWAG.

The foregoing first WLAN attach request and second WLAN attach request may be a same WLAN attach request, and may also be different WLAN attach requests.

Optionally, before the TWAN device sends the create session request message to the determined PDN gateway, the TWAN device may further determine a PDN type according to at least the subscription information, so that the PDN type can be carried in the create session request message sent to the PDN gateway.

In one implementation scenario, if the TWAN device determines, according to at least the subscription information, that it is only allowed to allocate an address of Internet Protocol version 4 IPV4 to the user equipment, the TWAN device determines that the PDN type is IPV4.

In another implementation scenario, if the TWAN device determines, according to at least the subscription information, that it is only allowed to allocate an address of Internet Protocol version 6 IPV6 to the user equipment, the TWAN device determines that the PDN type is IPV6.

In still another implementation scenario, if the TWAN device determines, according to at least the subscription information, that it is allowed to allocate an address of IPV4 and an address of IPV6 to the user equipment, the TWAN device determines that the PDN type is IPV4V6.

In yet another implementation scenario, if the TWAN device determines, according to at least the subscription information, that it is allowed to allocate an address of IPV4V6 to the user equipment, the TWAN device determines that the PDN type is IPV4V6.

In the method for establishing a packet data network PDN connection provided by this embodiment, a TWAN device determines a PDN gateway according to an APN obtained from a user equipment and subscription information of the user equipment obtained from an HSS/an AAA, and initiates a create session request message carrying the APN to the determined PDN gateway, so that an additional PDN connection or a PDN connection of a non-default APN is established for the user equipment to extend a network access range of the user equipment.

Figure 7:
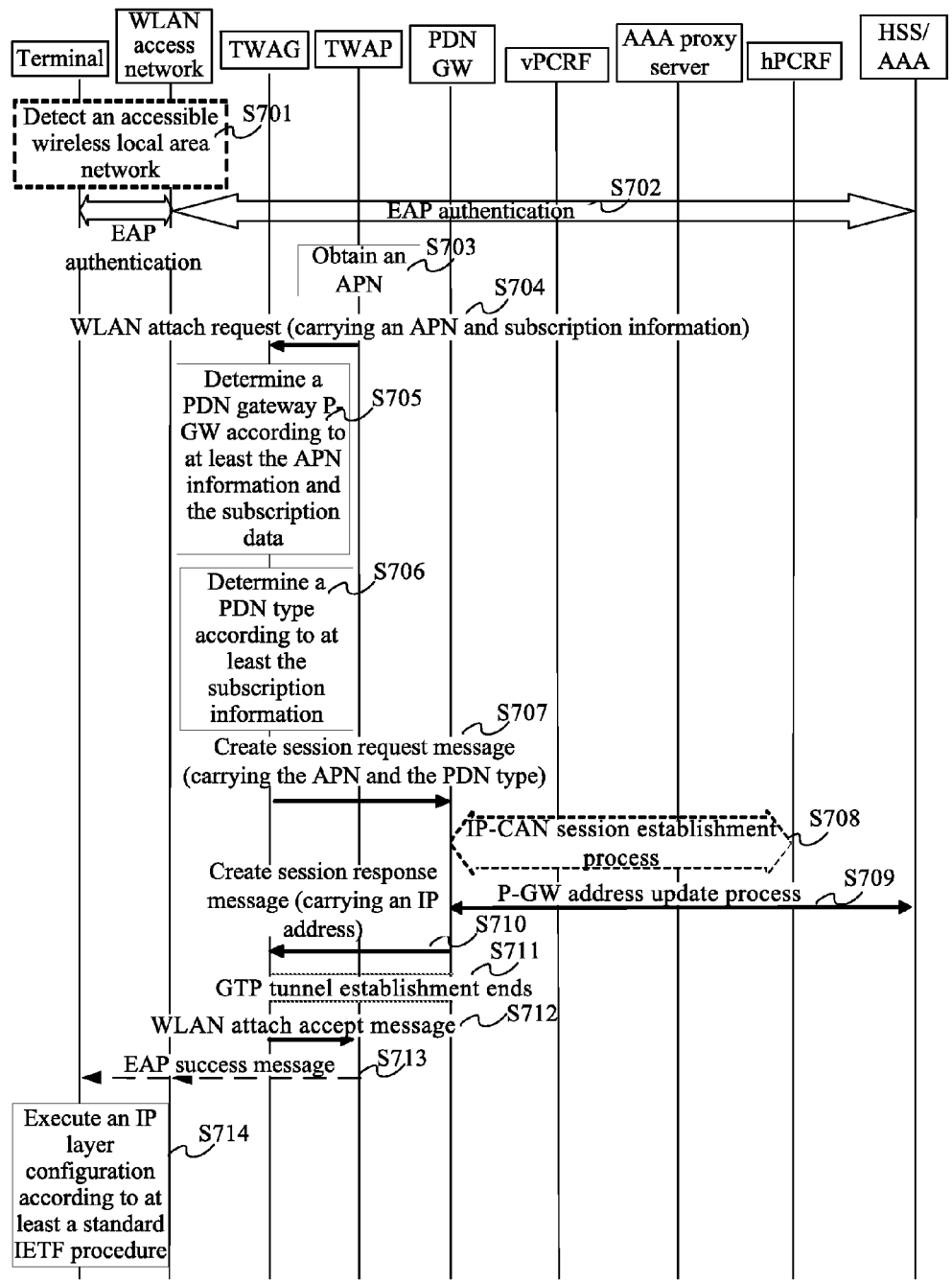
FIG. 7 is a flowchart of still yet another embodiment of a method for establishing a packet data network connection according to the present invention.

FIG. 7 is a flowchart of yet another embodiment of a method for establishing a packet data network PDN connection provided by the present invention. As shown in FIG. 7, a TWAN device includes a trusted WLAN access network (WLAN AN), a TWAP, and a TWAG. Further, the WLAN AN includes one or more sets of multiple wireless local area network access points. The method includes:

S701. A user equipment detects an accessible wireless local area network.

S702. The user equipment and an HSS/an AAA perform EAP authentication. During the EAP authentication, at least one message that the user equipment sends to the HSS or the AAA carries an APN.

S703. The TWAP receives a message carrying an APN from the user equipment or the HSS/AAA in the process of executing the EAP authentication by the user equipment and the HSS or the AAA.

Optionally, the TWAP may store the APN for determining a PDN gateway (PDN Gateway, P-GW) in a subsequent process of PDN establishment.

S704. The TWAP sends a WLAN attach request to the TWAG, where the WLAN attach request carries an APN of the user equipment and subscription information of the user equipment.

S705. The TWAG determines a PDN gateway according to at least the APN and the subscription data of the user equipment.

S706. The TWAG determines a PDN type according to at least the subscription information.

If the TWAN device determines, according to at least the subscription information, that it is only allowed to allocate an address of Internet Protocol version 4 IPV4 to the user equipment, the TWAN device determines that the PDN type is IPV4; or, if the TWAN device determines, according to at least the subscription information, that it is only allowed to allocated an address of Internet Protocol version 6 IPV6, the TWAN device determines that the PDN type is IPV6; or, if the TWAN device determines, according to at least the subscription information, that it is allowed to allocate an address of IPV4 and an address of IPV6, the TWAN device determines that the PDN type is IPV4V6; or if the TWAN device determines, according to at least the subscription information, that it is allowed to allocate an address of IPV4V6, the TWAN device determines that the PDN type is IPV4V6.

S707. The TWAG sends, according to at least the determined PDN gateway, a create session request message carrying the APN and the PDN type.

S708. The PDN gateway and an hPCRF execute a process of establishing an IP-CAN session.

S709. The PDN gateway and the HSS/AAA execute a process of updating a P-GW address.

S710. The PDN gateway returns a create session response (create session response) message to the TWAG, where the create session response message carries an IP address.

S711. Establishment of a GTP tunnel between the PDN gateway and the TWAG is completed.

S712. Establishment of a GTP tunnel between the WLAN access network and the PDN gateway is completed, and the TWAG returns a WLAN attach accept message to the TWAP.

S713. The WLAN access network returns an EAP success message to the user equipment to indicate that the EAP process succeeds.

S714. The user equipment executes an IP layer configuration according to at least a standard IETF procedure.

In the method for establishing a PDN connection provided by this embodiment, after a user equipment detects an accessible WLAN, the user equipment carries APN information in a process of executing an EAP authentication with an HSS or an AAA, so that after a TWAP obtains the APN information, the TWAP can send the APN information and subscription data of the user equipment to a TWAG; and after the TWAG receives a WLAN attach request carrying the APN information of the user equipment and the subscription information of the user equipment from the TWAP, the TWAG determines a PDN gateway according to at least the APN information and the subscription information, and may further determine a PDN type according to at least the subscription information. In this way, the APN and the PDN type are carried in a create session request message sent to the PDN gateway, so that an additional PDN connection or a PDN connection of a non-default APN is established for the user equipment to extend a network access range of the user equipment.

Figure 8:
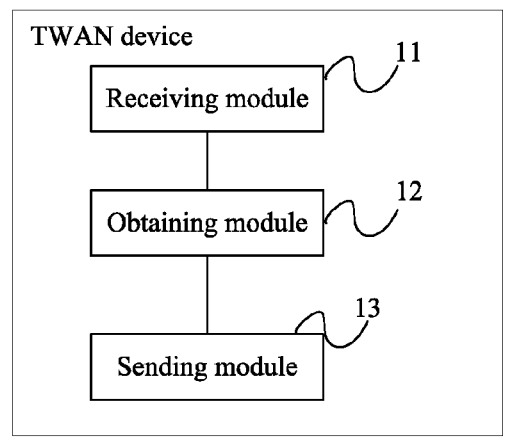
FIG. 8 is a schematic structural diagram of an embodiment of a trusted wireless local area network access network device according to the present invention.

FIG. 8 is a schematic structural diagram of an embodiment of a trusted wireless local area network access network device provided by the present invention. As shown in FIG. 8, the trusted wireless local area network access network device includes a receiving module 11, an obtaining module 12, and a sending module 13.

The receiving module 11 is configured to receive a trigger message from a user equipment.

The obtaining module 12 is configured to obtain an access point name (APN) from the user equipment.

The sending module 13 is configured to send a create session request message carrying the APN to a packet data network (PDN) gateway (PDN Gateway, P-GW).

The receiving module 11 is further configured to receive a create session response message carrying an IP address from the PDN gateway.

The sending module 13 is further configured to send the IP address to the user equipment.

Figure 9:
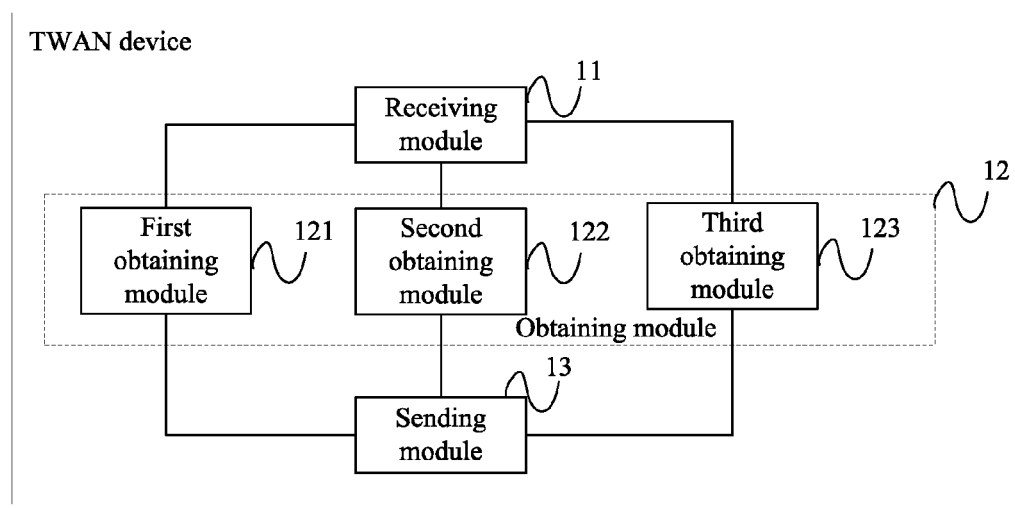
FIG. 9 is a schematic structural diagram of another embodiment of a trusted wireless local area network access network device according to the present invention.

FIG. 9 is a schematic structural diagram of another embodiment of a trusted wireless local area network access network device provided by the present invention. As shown in FIG. 9, the trusted wireless local area network access network device includes a receiving module 11, an obtaining module 12, and a sending module 13.

Optionally, the obtaining module 12 may include at least one of the following modules: a first obtaining module 121, configured to obtain an APN from a trigger message; a second obtaining module 122, configured to: when it is determined that a user equipment has already established at least one PDN connection, send a request message to the user equipment, receive a response message carrying an APN from the user equipment, and obtain the APN from the response message; and a third obtaining module 123, configured to receive a request message carrying an APN from the user equipment, and obtain the APN from the request message.

Optionally, the TWAN device may further include: a determining module 14, configured to determine whether an APN is a non-default APN, and trigger, when determining that the APN is a non-default APN, the sending module 13 to send a create session request message to a PDN gateway.

The trusted wireless local area network access network device provided by this embodiment of the present invention corresponds to the method for establishing a packet data network connection provided by the embodiment of the present invention and serves as an executive device of the method for establishing a packet data network connection. For details about a process of executing the method for establishing a packet data network connection by the trusted wireless local area network access network device, reference may be made to related descriptions in the embodiments shown in FIG. 1 and FIG. 5, which is not further described herein.

After receiving a trigger message from a user equipment, the trusted wireless local area network access network device provided by this embodiment initiates, according to an APN obtained from the user equipment, a create session request message carrying the obtained APN to a PDN gateway, so that an additional PDN connection or a PDN connection of a non-default APN is established for the user equipment to extend a network access range of the user equipment.

Figure 10:
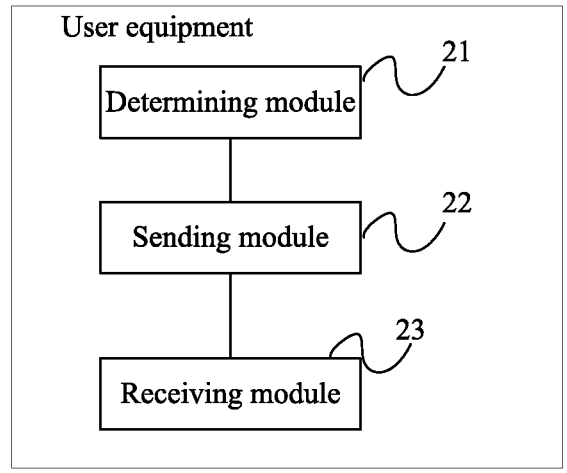
FIG. 10 is a schematic structural diagram of an embodiment of a user equipment according to the present invention.

FIG. 10 is a schematic structural diagram of an embodiment of a user equipment provided by the present invention. As shown in FIG. 10, the user equipment includes a determining module 21, a sending module 22, and a receiving module 23.

The determining module 21 is configured to determine a packet data network (PDN) type of a connection to be established.

The sending module 22 is configured to send, according to the determined PDN type, a trigger message to a trusted wireless local area network access network (TWAN) device, where the trigger message triggers the TWAN device to send a create session request message carrying an APN to a PDN gateway (PDN Gateway, P-GW), and the TWAN device receives a create session response message carrying an IP address from the PDN gateway.

The receiving module 23 is configured to receive the IP address from the TWAN device.

The user equipment provided by this embodiment of the present invention corresponds to the method for establishing a packet data network connection provided by the embodiment of the present invention and serves as an executive device of the method for establishing a packet data network connection. For details about a process of executing the method for establishing a packet data network connection by the user equipment, reference may be made to the related descriptions in the embodiment shown in FIG. 2, which is not further described herein.

After the user equipment provided by this embodiment sends a trigger message carrying an APN to a TWAN device, the TWAN device may initiate a create session request message carrying an obtained APN to a PDN gateway, so that an additional PDN connection or a PDN connection of a non-default APN is established for the user equipment to extend a network access range of the user equipment.

Figure 11:
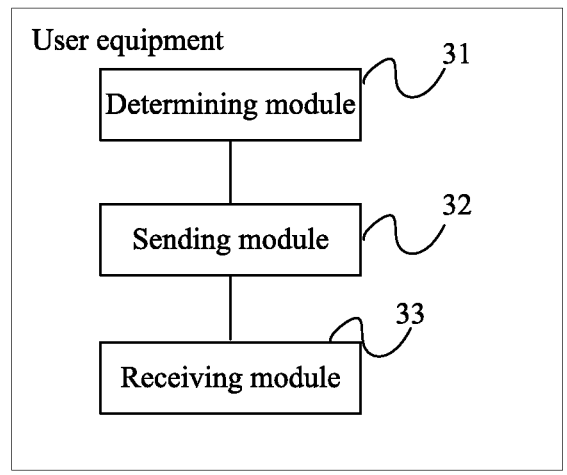
FIG. 11 is a schematic structural diagram of another embodiment of a user equipment according to the present invention.

FIG. 11 is a schematic structural diagram of another embodiment of a user equipment provided by the present invention. As shown in FIG. 11, the user equipment includes a determining module 31, a sending module 32, and a receiving module 33.

The determining module 31 is configured to determine a packet data network (PDN) type of a connection to be established.

The sending module 32 is configured to send a trigger message to a trusted wireless local area network access network (TWAN) device according to the determined PDN type.

The receiving module 33 is configured to receive a request message from the TWAN device.

The sending module 32 is further configured to send a response message carrying an access point name (APN) to the TWAN device, where the response message triggers the TWAN device to send a create session request message carrying the APN to a PDN gateway (PDN Gateway, P-GW) and receive a create session response message carrying an IP address from the PDN gateway.

The receiving module 33 is further configured to receive the IP address from the TWAN device.

The user equipment provided by this embodiment of the present invention corresponds to the method for establishing a packet data network connection provided by the embodiment of the present invention and serves as an executive device of the method for establishing a packet data network connection. For details about a process of executing the method for establishing a packet data network connection by the user equipment, reference may be made to related descriptions in the embodiment shown in FIG. 3, which is not further described herein.

After the user equipment provided by this embodiment sends a trigger message to a TWAN device, if a request message is received from the TWAN device, the user equipment may return a response message carrying an APN to the TWAN device, so that the TWAN device can initiate a create session request message carrying the obtained APN to a PDN gateway. In this way, an additional PDN connection or a PDN connection of a non-default APN is established for the user equipment to extend a network access range of the user equipment.

Figure 12:
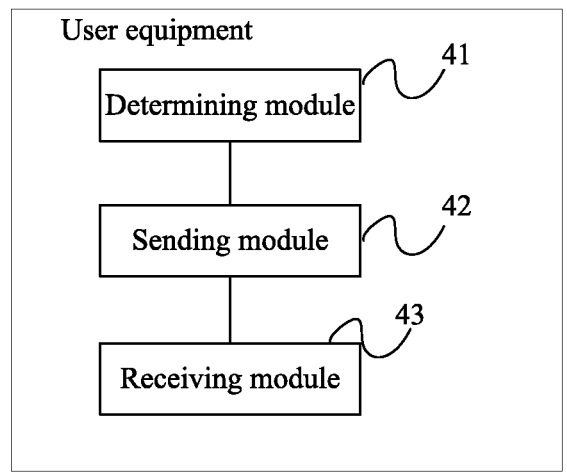
FIG. 12 is a schematic diagram of still another embodiment of a user equipment according to the present invention.

FIG. 12 is a schematic structural diagram of still another embodiment of a user equipment provided by the present invention. As shown in FIG. 12, the user equipment includes a determining module 41, a sending module 42, and a receiving module 43.

The determining module 41 is configured to determine a packet data network (PDN) type of a connection to be established.

The sending module 42 is configured to send a trigger message to a trusted wireless local area network access network (TWAN) device according to the determined PDN type.

The sending module 42 is further configured to send a request message carrying an access point name (APN) to the TWAN device, where the request message triggers the TWAN device to send a create session request message carrying the APN to a PDN gateway (PDN Gateway, P-GW) and receive a create session response message carrying an IP address from the PDN gateway.

The receiving module 43 is configured to receive the IP address from the TWAN device.

The user equipment provided by this embodiment of the present invention corresponds to the method for establishing a packet data network connection provided by the embodiment of the present invention and serves as an executive device of the method for establishing a packet data network connection. For details about a process of executing the method for establishing a packet data network connection by the user equipment, reference may be made to related descriptions in the embodiment shown in FIG. 4, which is not further described herein.

After the user equipment provided by this embodiment sends a trigger message to a TWAN device, the user equipment may further return a response message carrying an APN to the TWAN device, so that the TWAN device can initiate a create session request message carrying an obtained APN to a PDN gateway. In this way, an additional PDN connection or a PDN connection of a non-default APN is established for the user equipment to extend a network access range of the user equipment.

Figure 13:
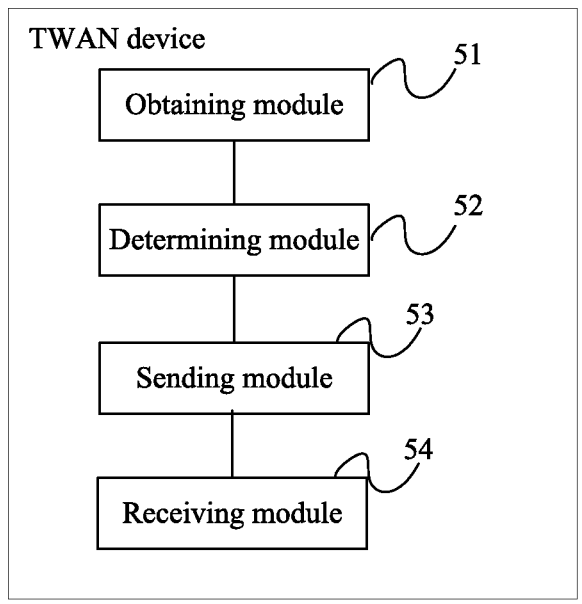
FIG. 13 is a schematic structural diagram of an embodiment of a trusted wireless local area network access network gateway according to the present invention.

FIG. 13 is a schematic structural diagram of an embodiment of a trusted wireless local area network access network device provided by the present invention. As shown in FIG. 13, the trusted wireless local area network access network device includes an obtaining module 51, a determining module 52, a sending module 53, and a receiving module 54.

The obtaining module 51 is configured to obtain an access point name (APN) from a user equipment, and obtain subscription information of the user equipment from a home subscriber server/an authentication, authorization and accounting (HSS/AAA).

The determining module 52 is configured to determine a packet data network (PDN) gateway (PDN Gateway, P-GW) according to at least the APN and the subscription information.

The sending module 53 is configured to send a create session request message carrying the APN to the determined PDN gateway.

The receiving module 54 is configured to receive a create session response message carrying an IP address from the PDN gateway.

The sending module 53 is further configured to send the IP address to the user equipment.

Optionally, the obtaining module 51 may be specifically configured to receive a message carrying the APN from the user equipment or the HSS/AAA in a process of executing Extensible Authentication Protocol EAP authentication by the user equipment and the HSS/AAA.

Accordingly, the create session request message may further carry a PDN type.

The determining module 52 may be further configured to determine the PDN type according to at least the subscription information.

Optionally, the determining module 52 may be specifically configured to: if the TWAN device determines, according to at least the subscription information, that it is only allowed to allocate an address of Internet Protocol version 4 IPV4 to the user equipment, determine that the PDN type is IPV4; or, if the TWAN device determines, at least according to the subscription information, that it is only allowed to allocate an address of Internet Protocol version 6 IPV6 to the user equipment, determine that the PDN type is IPV6; or if the TWAN device determines, at least according to the subscription information, that it is allowed to allocate an address of IPV4 or an address of IPV6 to the user equipment, determine that the PDN type is IPV4V6; or if the TWAN device determines, at least according to the subscription information, that it is allowed to allocate an address of IPV4V6 to the user equipment, determine that the PDN type is IPV4V6.

The trusted wireless local area network access network device provided by this embodiment of the present invention corresponds to the method for establishing a packet data network connection provided by the embodiment of the present invention and serves as an executive device of the method for establishing a packet data network connection. For details about a process of executing the method for establishing a packet data network connection by the trusted wireless local area network access network device, reference may be made to related descriptions in the embodiments shown in FIG. 6 and FIG. 7, which is not further described herein.

The trusted wireless local area network access network device provided by this embodiment determines a PDN gateway according to an APN obtained from a user equipment and subscription information of the user equipment obtained from an HSS/an AAA, and initiates a create session request message carrying the obtained APN to the determined PDN gateway, so that an additional PDN connection or a PDN connection of a non-default APN is established for the user equipment to extend a network access range of the user equipment.

A person skilled in the art may clearly understand that for description convenience and brevity, the division of each of the foregoing functional modules is merely described as an example. In a practical application, the foregoing functions may be implemented by different functional modules according to a requirement, that is, an internal structure of the apparatus is divided into different functional modules to perform all or some of the functions described in the foregoing. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor to perform all or a part of the steps of the methods in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for establishing a packet data network (PDN) connection, comprising:
    receiving, by a trusted wireless local area network access network (TWAN) device, a message carrying an access point name (APN) from a home subscriber server/an authentication, authorization and accounting (HSS/AAA) during a process of executing Extensible Authentication Protocol (EAP) authentication by a user equipment and the HSS/AAA, wherein the APN is obtained by the HSS/AAA from the user equipment during the EAP authentication before the APN is sent to the TWAN device by the HSS/AAA;
    obtaining, by the TWAN device, subscription information of the user equipment from the HSS/AAA;
    determining, by the TWAN device, a PDN gateway according to at least the APN and the subscription information;
    determining, by the TWAN device, a PDN type according to at least the subscription information;
    sending, by the TWAN device, a create session request message carrying the APN to the determined PDN gateway, wherein the create session request message further carries the PDN type;
    receiving, by the TWAN device, a create session response message carrying an internet protocol (IP) address from the PDN gateway; and
    sending, by the TWAN device, the IP address to the user equipment.

2. The method according to claim 1, wherein receiving, by the TWAN device, the message carrying the APN from the HSS/AAA comprises:
    receiving, by a trusted WLAN access gateway (TWAG), a first wireless local area network (WLAN) attach request carrying the APN from a trusted WLAN access peer/proxy (TWAP), wherein the APN is obtained by the TWAP from a message sent by the HSS/AAA during a process of executing extensible authentication protocol EAP authentication by the user equipment and the HSS/AAA.

3. The method according to claim 1, wherein obtaining subscription information of the user equipment from the HSS/AAA comprises:
    receiving, by a trusted WLAN access gateway (TWAG), a second wireless local area network (WLAN) attach request carrying the subscription information from a trusted WLAN access peer/proxy (TWAP), wherein the subscription information is obtained by the TWAP from the HSS/AAA.

4. The method according to claim 1, wherein determining the PDN type according to at least the subscription information comprises:
    if the TWAN device determines, according to at least the subscription information, that it is only allowed to allocate an address of Internet Protocol version 4 (IPV4) to the user equipment, determining, by the TWAN device, that the PDN type is IPV4.

5. The method according to claim 1, wherein determining the PDN type according to at least the subscription information comprises:
    if the TWAN device determines, according to at least the subscription information, that it is only allowed to allocate an address of Internet Protocol version 6 (IPV6) to the user equipment, determining, by the TWAN device, that the PDN type is IPV6.

6. The method according to claim 1, wherein determining the PDN type according to at least the subscription information comprises:
    if the TWAN device determines, according to at least the subscription information, that it is allowed to allocate an address of IPV4 or an address of IPV6 to the user equipment, determining, by the TWAN device, that the PDN type is IPV4V6.

7. The method according to claim 1, wherein determining the PDN type according to at least the subscription information comprises:
    if the TWAN device determines, according to at least the subscription information, that it is allowed to allocated an address of IPV4V6 to the user equipment, determining, by the TWAN device, that the PDN type is IPV4V6.

8. A trusted wireless local area network access network device, comprising:
    a receiver, configured to receive a message carrying an access point name (APN) from a home subscriber server/an authentication, authorization and accounting (HSS/AAA) in a process of executing EAP authentication by a user equipment and the HSS/AAA, wherein the APN is obtained by the HSS/AAA from the user equipment during the EAP authentication before the APN is sent to the trusted wireless local area network access network device by the HSS/AAA;

a processor; and a non-transitory computer-readable storage medium storing a program to be executed by the processor, the program including instructions for:

obtaining the APN from the receiver;

obtaining subscription information of the user equipment from the HSS/AAA determining a PDN gateway according to at least the APN and the subscription information;

determining a PDN type according to at least the subscription information;

sending a create session request message carrying the APN and the PDN type to the determined PDN gateway;

receiving a create session response message carrying an internet protocol (IP) address from the PDN gateway; and sending the IP address to the user equipment.

9. The trusted wireless local area network access network device according to claim 8, wherein the program further includes instructions for:

if the trusted wireless local area network access network device determines, according to at least the subscription information, that it is only allowed to allocate an address of Internet Protocol version 4 (IPV4) to the user equipment, determining that the PDN type is IPV4.

10. The trusted wireless local area network access network device according to claim 8, wherein the program further includes instructions for:

if the trusted wireless local area network access network device determines, according to at least the subscription information, that it is only allowed to allocate an address of Internet Protocol version 6 (IPV6) to the user equipment, determining that the PDN type is IPV6.

11. The trusted wireless local area network access network device according to claim 8, wherein the program further includes instructions for:

if the trusted wireless local area network access network device determines, according to at least the subscription information, that it is allowed to allocate an address of IPV4 or an address of IPV6 to the user equipment, determining that the PDN type is IPV4V6.

12. The trusted wireless local area network access network device according to claim 8, wherein the program further includes instructions for:

if the trusted wireless local area network access network device determines, according to at least the subscription information, that it is allowed to allocate an address of IPV4V6 to the user equipment, determining that the PDN type is IPV4V6.

13. A trusted wireless local area network access network device, comprising:

a processor; and a non-transitory computer-readable storage medium storing a program to be executed by the processor, the program including instructions for:

obtaining an access point name (APN) from a user equipment, and obtaining subscription information of the user equipment from a home subscriber server/ an authentication, authorization and accounting (HSS/AAA);

determining a PDN gateway according to at least the APN and the subscription information;

determining a PDN type of a PDN connection requested by the user equipment, and determining whether a PDN connection corresponding to the PDN type is currently allocated to the user equipment, wherein the PDN type is determined according to the obtained subscription information of the user equipment;

determining whether the APN corresponds to a default APN;

in response to determining that the APN corresponds to a default APN and that a PDN connection corresponding to the PDN type has previously been allocated to the user equipment, determining not to send a create session request message;

in response to determining that the APN does not correspond to a default APN and that a PDN connection corresponding to the PDN type has not previously been allocated to the user equipment, sending a create session request message carrying the APN and the PDN type to the determined PDN gateway; and when the create session request message is sent, receiving a create session response message carrying an internet protocol (IP) address from the PDN gateway, and sending the IP address to the user equipment.

* * * * *